(12) United States Patent
Lin et al.

(10) Patent No.: US 10,213,967 B2
(45) Date of Patent: Feb. 26, 2019

(54) FABRICATING DEVICE OF THREE-DIMENSIONAL SCAFFOLD AND FABRICATING METHOD THEREOF

(71) Applicant: ACADEMIA SINICA, Taipei (TW)

(72) Inventors: Keng-Hui Lin, Taipei (TW); Yi-Hsuan Lee, Taipei (TW)

(73) Assignee: Academia Sinica, Taipei (TW)

( * ) Notice: Subject to any disclaimer, the term of this patent is extended or adjusted under 35 U.S.C. 154(b) by 857 days.

(21) Appl. No.: 14/302,243

(22) Filed: Jun. 11, 2014

(65) Prior Publication Data

US 2015/0183144 A1 Jul. 2, 2015

(30) Foreign Application Priority Data

Dec. 31, 2013 (TW) .............................. 102149349 A (51) Int. Cl.
| | | |
|---|---|---|
| *B29C 67/20* | (2006.01) | |
| *B29K 77/00* | (2006.01) | |
| *B29K 105/00* | (2006.01) | |
| *B29K 105/04* | (2006.01) | |
| *B29K 105/24* | (2006.01) | |

(52) U.S. Cl.
CPC .......... *B29C 67/20* (2013.01); *B29K 2077/00* (2013.01); *B29K 2105/0002* (2013.01); *B29K 2105/0005* (2013.01); *B29K 2105/0014* (2013.01); *B29K 2105/0061* (2013.01); *B29K 2105/04* (2013.01); *B29K 2105/24* (2013.01)

(58) Field of Classification Search
None
See application file for complete search history.

(56) References Cited

U.S. PATENT DOCUMENTS

| | | | |
|---|---|---|---|
| 6,130,098 A | 10/2000 | Handique et al. | |
| 8,513,014 B2 * | 8/2013 | Lin .......................... | B29C 44/00 |
| | | | 435/283.1 |
| 2009/0197772 A1 | 8/2009 | Griffiths et al. | |
| 2010/0136544 A1 | 6/2010 | Agresti et al. | |
| 2011/0285047 A1 | 11/2011 | Lin et al. | |
| 2013/0089594 A1 | 4/2013 | Anderson et al. | |
| 2013/0309770 A1 * | 11/2013 | Lin ......................... | B29C 44/00 |
| | | | 435/395 |

FOREIGN PATENT DOCUMENTS

| | | |
|---|---|---|
| EP | 0808853 A2 | 11/1997 |
| TW | 201204334 A1 | 2/2012 |
| TW | 201233380 A1 | 8/2012 |

OTHER PUBLICATIONS

Lee, Three-dimensional fibroblast morphology on compliant substrates of controlled negative curvature, Integrative Biology, 2013, 5, 1447.*
Vaz et al., Fibronectin promotes migration, alignment and fusion in an in vitro myoblast cell model, Cell Tissue Res (2012) 348:569-578.*
Bio-Rad, Electrophoresis, Acrylamide Polymerization, Tech Note 1156, Jul. 2003.*
Gunther et al., Transport and reaction in microscale segmented gas—liquid flow, L a b C h i p ,2 0 0 4 , 4 , 2 7 8-2 8 6.*
Garstecki et al., Design for mixing using bubbles in branched microfluidic channels, Applied Physics Letters 86, 244108,2005.*

* cited by examiner

*Primary Examiner* — Taeyoon Kim
*Assistant Examiner* — Srikanth Patury
(74) *Attorney, Agent, or Firm* — Muncy, Geissler, Olds & Lowe, P.C.

(57) ABSTRACT

A fabricating device of a three-dimensional (3-D) scaffold comprises a bubble generator, a bubble mixing channel, a coagulating solution channel and a bubble collector. The bubble generator includes a gas channel and a gel solution channel crossing the gas channel. The bubble mixing channel is connected with a first outlet of the bubble generator. The coagulating solution channel is connected with the bubble mixing channel. The bubble collector is connected with a second outlet of the bubble mixing channel.

13 Claims, 7 Drawing Sheets

FABRICATING DEVICE OF THREE-DIMENSIONAL SCAFFOLD AND FABRICATING METHOD THEREOF

CROSS REFERENCE TO RELATED APPLICATIONS

This Non-provisional application claims priority under 35 U.S.C. § 119(a) on Patent Application No(s). 102149349 filed in Taiwan, Republic of China on Dec. 31, 2013, the entire contents of which are hereby incorporated by reference.

BACKGROUND OF THE INVENTION

Field of Invention

The invention relates to a fabricating device of a three-dimensional scaffold and a fabricating method thereof and, in particular, to a fabricating device of a three-dimensional (3-D) scaffold and a fabricating method thereof used in tissue engineering or cell culture.

Related Art

Cell culture and tissue engineering are key technologies for the regenerative medicine, wherein a lot of breeding is generated in an artificial manner to supply sufficient cells for the experiment and analysis, and the conditions required for the cell and tissue growth are simulated and provided so that the cell obtained by the culture can grow to become the cell or tissue with a specific nature.

Although the regenerative medicine can be used to eliminate the uncertainty of patients waiting for the organ donation and the potential misgiving of the repulsion of the immune system due to the organ transplant, it is still developed under some technical limitation, such as cell culture and 3-D scaffold.

In the cell culture technology, the scaffold plays an extremely important role to make the cell obtained by the culture become a tissue or organ fitting a required function and form. The scaffold provides a 3-D structure properly for the cell growth, and is so called the 3-D scaffold. The scaffold has a lot of holes for the cell adhesion or breeding, and thereby the cell can be guided to grow up towards a planned 3-D orientation to form an imitated regenerative tissue or organ.

In the conventional fabricating method of a scaffold, the ball bodies are stacked and the gel is supplied therein, and then the ball bodies are removed, after the gel is coagulated, to form the holes which have the same size as the ball bodies for the cell adhesion or breeding. However, in the conventional fabricating method of a scaffold, the structure around the ball bodies are easy to be damaged during the process of removing the ball bodies. Besides, the step of removing the ball bodies is complicated and the cost thereof is quite high, and the fabricating process also takes a long time.

Therefore, it is an important subject to provide a fabricating device of a three-dimensional scaffold and a fabricating method thereof that can fabricate the 3-D scaffold in a simplified way and device to simplify the operation of fabricating the scaffold and reduce the fabricating time.

SUMMARY OF THE INVENTION

In view of the foregoing subject, an objective of the invention is to provide a fabricating device of a three-dimensional scaffold and a fabricating method thereof that can fabricate the 3-D scaffold in a simplified way and device to simplify the operation of fabricating the scaffold and reduce the fabricating time.

To achieve the above objective, a fabricating device of a three-dimensional (3-D) scaffold according to the invention comprises a bubble generator, a bubble mixing channel, a coagulating solution channel and a bubble collector. The bubble generator includes a gas channel and a gel solution channel crossing the gas channel. The bubble mixing channel is connected with a first outlet of the bubble generator. The coagulating solution channel is connected with the bubble mixing channel. The bubble collector is connected with a second outlet of the bubble mixing channel.

In one embodiment, the coagulating solution channel is disposed on the side of the bubble mixing channel closer to the bubble generator and disposed apart from the first outlet by a distance.

In one embodiment, the bubble mixing channel includes at least a bent portion.

In one embodiment, the bent portion is disposed between the second outlet and the intersection of the bubble mixing channel and the coagulating solution channel.

In one embodiment, an intersection of the gas channel and the gel solution channel is adjacent to the first outlet.

In one embodiment, an aperture of the bubble mixing channel is between 10 μm and 1 mm.

In one embodiment, the bubble collector includes a lower plate, and the lower plate has a plurality of recesses to accommodate the bubbles.

In one embodiment, the bubble collector further includes an upper plate, and the upper plate and the lower plate are tightly connected with each other to cover the recesses.

To achieve the above objective, a fabricating method of a 3-D scaffold according to the invention comprises steps of: supplying a gel solution and an airflow into a bubble generator to form a plurality of bubbles; supplying the bubbles into a bubble mixing channel; adding a coagulating solution into the bubble mixing channel to result in a gel coagulation effect; and communicating with at least a part of the bubbles to form a 3-D scaffold.

In one embodiment, the gel solution contains a first material and a second material, and the first and second materials are mixed to form the gel solution.

In one embodiment, one of the first and second materials contains monomers, and the other contains a crosslinker.

In one embodiment, the coagulating solution contains an initiator.

In one embodiment, the gel solution further contains a catalyst.

In one embodiment, the gel coagulation effect is given under the environment with the temperature of 50° C.~70° C.

In one embodiment, in the step of communicating with at least a part of the bubbles, the bubbles are immersed in a liquid under a low pressure environment and the gas within the bubbles is removed by an air extraction.

In one embodiment, the fabricating method further comprising a step of: immersing the 3-D scaffold in a protein solution.

In one embodiment, the protein solution contains a fibronectin.

In one embodiment, the fabricating method further comprising a step of: immersing the 3-D scaffold in a crosslinking reagent.

In one embodiment, the fabricating method further comprising a step of:

implementing a washing by a phosphate buffered saline, a clean water, an isotonic solution or an isotonic culture solution.

In one embodiment, the bubble generator includes a gas channel and a gel solution channel, the gel solution channel crosses the gas channel, the gel solution flows through the gel solution channel, and the airflow flows through the gas channel.

In one embodiment, the bubble mixing channel is connected with a first outlet of the bubble generator and a coagulating solution channel, and the coagulating solution channel is disposed on the side of the bubble mixing channel closer to the bubble generator and disposed apart from the first outlet by a distance.

As mentioned above, in the fabricating method and device of a 3-D scaffold of the invention, the bubble generator is just used to make the flowing gel solution and airflow form a plurality of bubbles, and the bubbles flow through the first outlet and within the bubble mixing channel and start to contact the coagulation solution when flowing through the intersection of the coagulating solution channel and the bubble mixing channel, so that the foam containing gel solution and the coagulating solution are mixed together within the bubble mixing channel to result in the gel coagulation effect. After becoming more viscous due to the gel coagulation effect within the bubble mixing channel, the bubbles flow through the second outlet to enter into the bubble collector for the bubble stacking. Besides, the gel coagulation effect can be completed in the bubble collector so that the bubbles can be coagulated to form a 3-D bubble stack structure. Subsequently, at least a part of the bubbles are made communicate with each other to form a 3-D scaffold. Therefore, the invention provides a simple and fast fabricating device and method of the 3-D scaffold.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
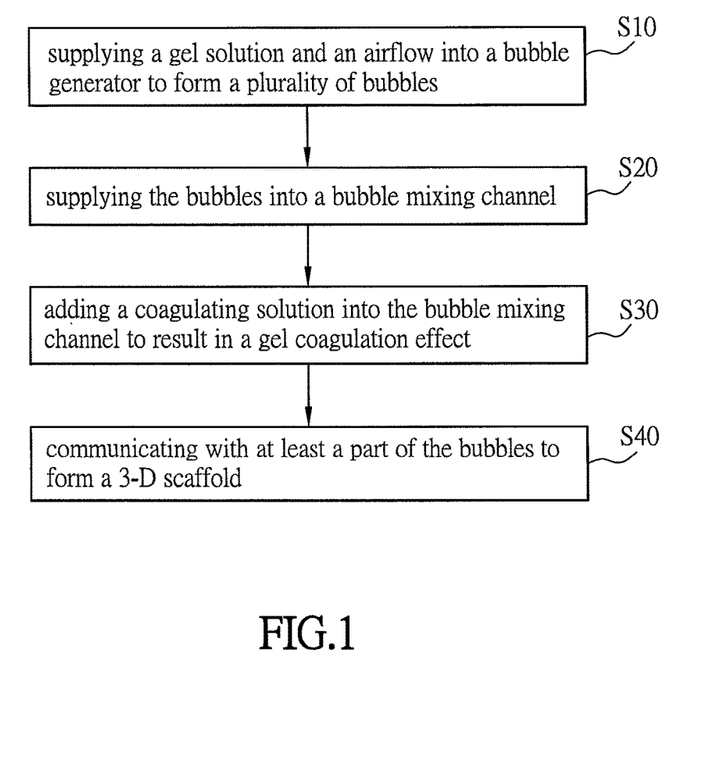
FIG. 1 is a schematic flowchart of a fabricating method of a three-dimensional (3-D) scaffold according to an embodiment of the invention.
Figure 2A:
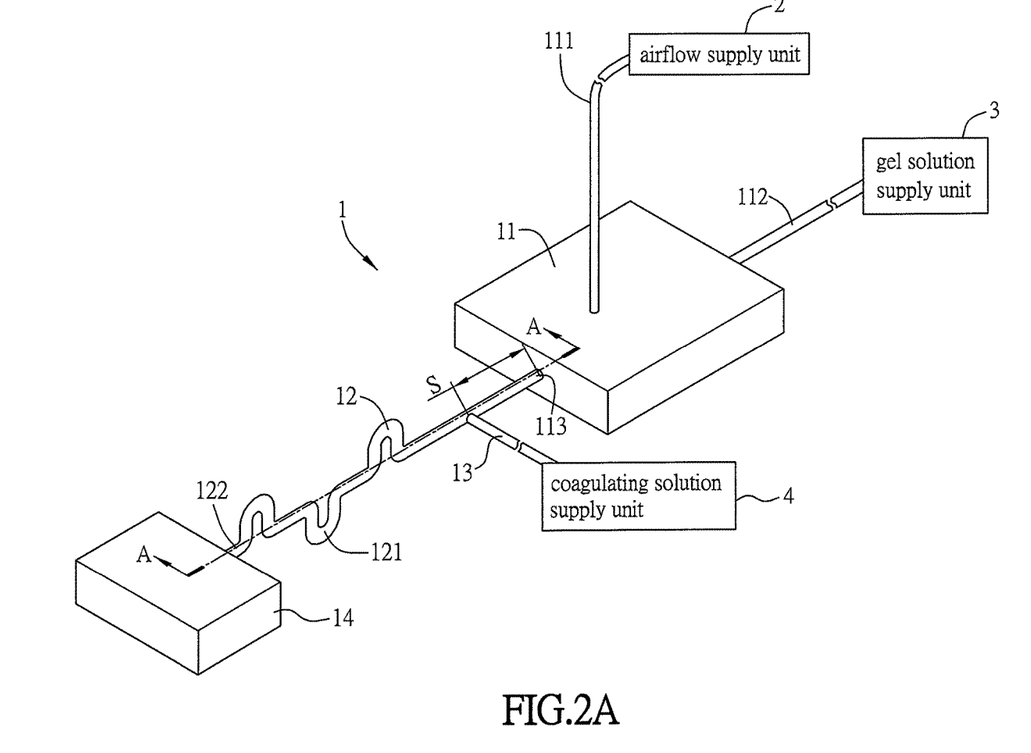
FIG. 2A is a schematic diagram of a fabricating device of a 3-D scaffold according to an embodiment of the invention.
Figure 2B:
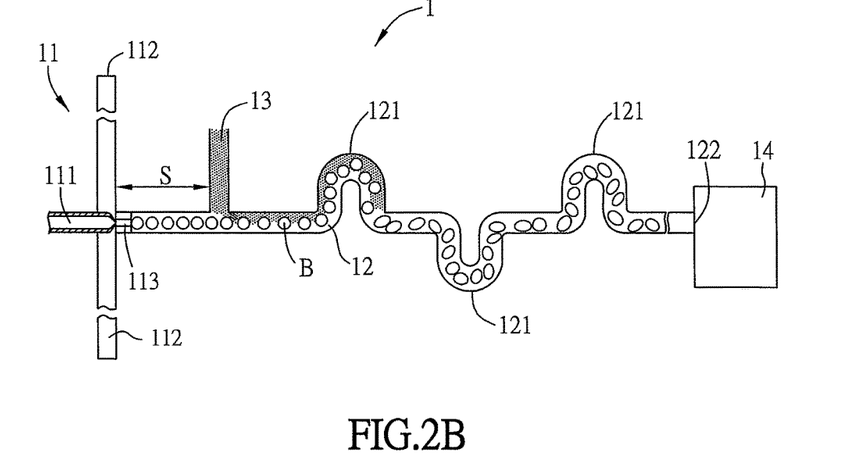
FIG. 2B is a schematic sectional diagram taken along the line A-A in FIG. 2A.

FIG. 1 is a schematic flowchart of a fabricating method of a three-dimensional (3-D) scaffold according to an embodiment of the invention, FIG. 2A is a schematic diagram of a fabricating device of a 3-D scaffold according to an embodiment of the invention, and FIG. 2B is a schematic sectional diagram taken along the line A-A in FIG. 2A. In this embodiment, the fabricating method can be implemented by the fabricating device in FIGS. 2A and 2B. Therefore, the fabricating method of the 3-D scaffold in FIG. 1 will be illustrated, and then the details of the method will be illustrated in cooperation with the fabricating device of the 3-D scaffold, by referring to FIGS. 1, 2A, 2B.

The fabricating method of the 3-D scaffold of this embodiment includes the steps of: supplying a gel solution and an airflow into a bubble generator to form a plurality of bubbles (step S10); supplying the bubbles into a bubble mixing channel (step S20); adding a coagulating solution into the bubble mixing channel to result in a gel coagulation effect (step S30); and communicating with at least a part of the bubbles to form a 3-D scaffold (step S40).

The fabricating device 1 of the 3-D scaffold of this embodiment includes a bubble generator 11, a bubble mixing channel 12, a coagulating solution channel 13 and a bubble collector 14. Two ends of the bubble mixing channel 12 are connected to the bubble generator 11 and the bubble collector 14, respectively. The bubble generator 11 can generate a plurality of bubbles B, which flow to the bubble collector 14 through the bubble mixing channel 12. In detail, corresponding to the step S10, the bubble generator 11 of this embodiment is a board-like bubble generator having two channels for example. The bubble generator 11 includes a gas channel 111 and a gel solution channel 112. The gel solution channel 112 crosses the gas channel 111. In this embodiment, the gel solution channel 112 and the gas channel 111 are perpendicular to each other to form a crossing type. Of course, in other embodiments, the generator 11 also can have another type of structure, and this invention is not limited thereto.

The gas channel 111 is connected with an airflow supply unit 2 to provide an airflow. The airflow is favorably formed by a flowing gas with a good chemical stability, and is, for example but not limited to, a nitrogen gas airflow, fluorine-contained gas airflow, inert gas airflow or atmosphere airflow. The airflow supply unit 2 is favorably capable of retaining the minimum contamination probability of the inner gas and adjusting the ejection pressure of the airflow, the flowing velocity and/or the gas output per unit time. By the control of the airflow supply unit 2, the volume of the gas within the bubble B can be adjusted, and this is simple and easy to be used. In this embodiment, the gas volume can occupy 50%~90% of the total volume of the bubble B.

The gel solution channel 112 is connected with a gel solution supply unit 3 to provide a gel solution. The gel solution supply unit 3 can be any device that can easily supply the gel solution into the gel solution channel 112, and is, for example but not limited to, a trough that can store liquid. The gel solution supply unit 3 has no special limitation in structure or shape, and favorably, it can retain the minimum contamination probability of the inner gel solution and can adjust the output pressure of the gel solution, the flowing velocity and/or the output per unit time. In order to make sure that the 3-D scaffold won't be contaminated, in this embodiment, the flowing path which starts from the transportation from the airflow supply unit 2 and the gel solution supply unit 3 to the gas channel 111 and the gel solution channel 112 and ends in the formation of the bubble is formed by a closed channel, and therefore the risk of contamination can be reduced.

Accordingly, when the gel solution flows through the gel solution channel 112 and the airflow flows through the gas channel 111, the bubbles B can be formed at the intersection of the gel solution channel 112 and the gas channel 111. The bubbles B flow out of the first outlet 113 which connects the bubble generator 11 and the bubble mixing channel 12. Favorably, the end of the gas channel 111 has a tapering portion with a decreasing tube diameter thinner than another portion of the gas channel 111. The intersection of the gas channel 111 and the gel solution channel 112 is adjacent to the first outlet 113, being advantageous to the formation of small-sized bubbles.

In this embodiment, the gel solution will be exemplified as the one that can be crosslinked. In detail, the gel solution can contain a first material and a second material, and the first and second materials are mixed to form a crosslinkable solution. One of the first and second materials contains monomer, and the other contains crosslinker. In this embodiment, the first material is monomer, and is, for example but not limited to, acrylamide. The second material is crosslinker, and is, for example but not limited to, N,N'-Methylenebisacrylamide (also know as Bisacrylamide). After mixed together, the monomer (first material) and the crosslinker (second material) become a gel solution. The said gel solution is a liquid-state object without solid-state gel, and an initiation needs to be started first so that the monomer and the crosslinker can be crosslinked to be coagulated into a solid-state gel structure. Moreover, the ratio of the monomer (first material) to the crosslinker (second material) can be adjusted to control the hardness of the gel that is formed by the coagulation, which is also the hardness of the 3-D scaffold formed by the subsequent step (step S30). Favorably, the ratio of the monomer (first material) to the crosslinker (second material) can be between 20:1 and 50:1. For example, when the ratio of the monomer (first material) to the crosslinker (second material) is 12/0.6, 12/0.3, 12/0.145, 7/0.2, 7.5/0.1, 5/0.2, the hardness of the 3-D scaffold formed by the subsequent step is 6045 Pa, 2470 Pa, 1256 Pa, 780 Pa, 480 Pa, 320 Pa, respectively. Therefore, in this embodiment, the ratio of the first material to the second material of the gel solution can be adjusted to adjust the hardness of the 3-D scaffold.

In this embodiment, the gel solution is the mixture of the first and second materials disposed into the gel solution supply unit 3, and the bubbles B can be formed after mixing the gel solution and the gas through the intersection of the gel solution channel 112 and the gas channel 111. Of course, two gel solution channels can be provided in other embodiments, and one provides a first material while the other provides a second material, and the two gel solution channels can be separated from each other.

As shown in FIGS. 1 and 2B, in the step S20, the bubbles B are supplied into a bubble mixing channel 12. In other words, the bubbles B formed by the contact of the gel solution with the airflow (step S10) flow out of the first outlet 113 and flow into the bubble mixing channel 12 (step S20). Then, in the step S30, the coagulating solution is added into the bubble mixing channel 12 to cause a gel coagulation effect to the bubbles B, which means the foam containing the gel solution is coagulated into a solid-state structure. One end of the coagulating solution channel 13 is connected with the bubble mixing channel 12, and the other end of the coagulating solution channel 13 is connected with the coagulating solution supply unit 4. As shown in FIG. 2A, the coagulating solution flows to the bubble mixing channel 12 through the coagulating solution channel 13. Favorably, the coagulating solution channel 13 is disposed on the side of the bubble mixing channel 12 closer to the bubble generator 11 and disposed apart from the first outlet 113 by a distance S. Hence, the initially formed foam containing gel solution can't contact the coagulation solution until arriving at the intersection of the bubble mixing channel 12 and the coagulating solution channel 13, and the gel coagulation effect of the foam containing gel solution is generated therefrom.

As mentioned above, the coagulating solution is the substance that can provide a gel coagulation effect for the gel solution. In this embodiment, since the gel solution is formed by mixing the monomer (first material) and the crosslinker (second material), the coagulating solution can contain an initiator. In detail, the monomer is a basic unit to form the gel and also the main ingredient of the gel solution. However, the polymerization of the monomers will be started just after the initiator supplies free radicals. Moreover, the polymerization of the monomers forms a linear crosslink, and the crosslinker can connect to the monomers to make the polymerization of the monomers generate branches so that the monomers can be coagulated to form the gel. In this embodiment, the initiator is, for example but not limited to, Ammonium Persulfate (APS). Favorably, the gel solution can further contain a catalyst, which is, for example but not limited to, N,N,N',N'-Tetramethylethylenediamine (TEMED) and can accelerate the gel coagulation effect. In detail, the catalyst is the substance that can assist in carrying the free radicals, so it can accelerate the crosslink between the monomers and between the monomers and the crosslinker so as to accelerate the gel coagulation effect.

Figure 2C:
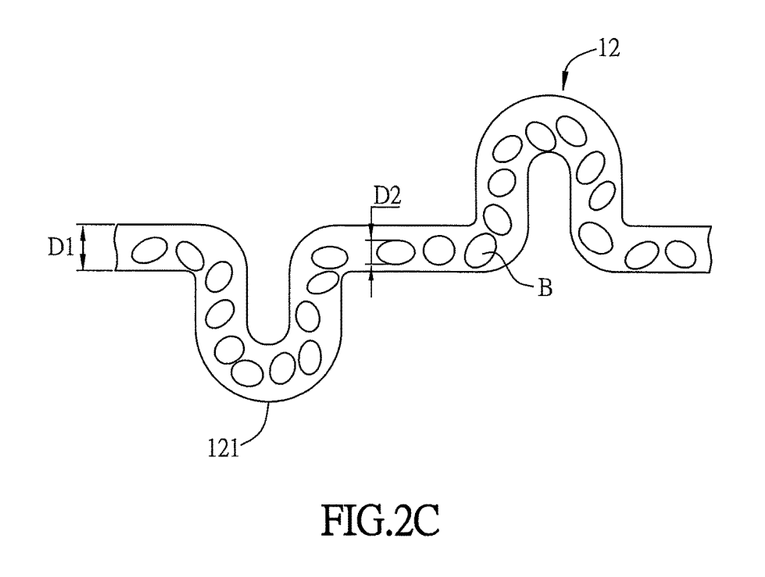
FIG. 2C is a schematic diagram of a part of the bubble mixing channel in FIG. 2B.

FIG. 2C is a schematic diagram of a part of the bubble mixing channel in FIG. 2B. As shown in FIGS. 2B and 2C, in this embodiment, the aperture D1 of the bubble mixing channel 12 is between 10 μm and 1 mm, and the bubble mixing channel 12 is a circular tube structure. In other words, the bubble mixing channel 12 has a diameter between 10 μm and 1 mm. In general, the initially formed bubble B is circular, and if the bubble mixing channel 12 is a linear structure, the bubble B can be kept a circular shape. Nevertheless, the bubble mixing channel 12 of this embodiment includes at least a bent portion 121, so the bubble B will be compressed and thus deformed into a non-circular shape when flowing within the bubble mixing channel 12 and into the bent portion 121. In detail, the cross-section of the bubble B has a closed contour, and the minimum distance D2 of the closed contour is less than the aperture D1 of the bubble mixing channel 12.

Favorably, as shown in FIG. 2B, the bent portion 121 is disposed between the bubble collector 14 and the intersection of the bubble mixing channel 12 and the coagulating solution channel 13. In detail, one end of the bubble mixing channel 12 is connected with the first outlet 113 of the bubble generator 11, and the other end thereof is a second outlet 122 connecting the bubble collector 14. The bent portion 121 is disposed between the second outlet 122 and the intersection of the bubble mixing channel 12 and the coagulating solution channel 13. Since the gel coagulation effect can't be completed totally after the coagulating solution contacts the gel solution, the disposition of the bent portion 121 can allow the eddy current to be generated when the foam containing gel solution and the coagulating solution flow through the bent portion 121, and the eddy current can assist in increasing the duration of the gel coagulation effect occurring between the bubbles B and the coagulating solution.

Figure 3A:
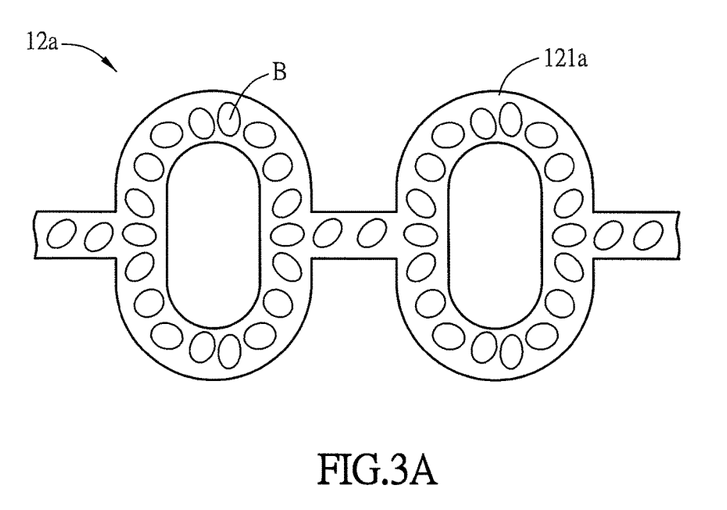
FIG. 3A is a schematic diagram of a variation of the bubble mixing channel in FIG. 2B.
Figure 3B:
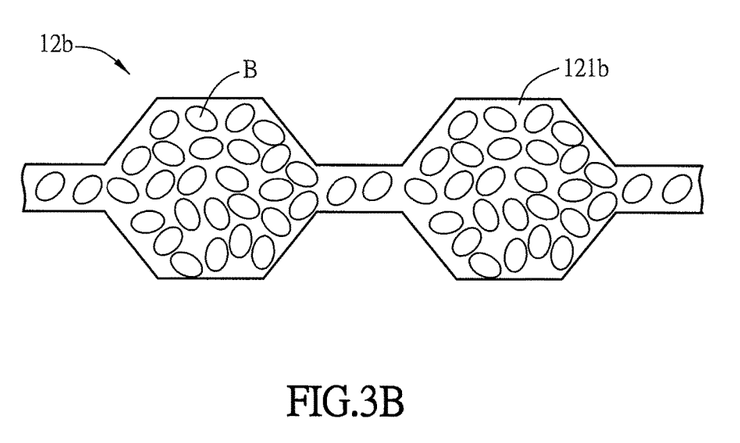
FIG. 3B is a schematic diagram of another variation of the bubble mixing channel in FIG. 2B.

As shown in FIG. 2B, in this embodiment, the bubble mixing channel 12 includes three U-shaped bent portions 121 which have alternate bent directions. However, this invention is not limited thereto. In detail, the number of the bent portions 121 is not limited, which can be determined according to the length of the bubble mixing channel 12. Of course, the shape of the bubble mixing channel 12 is not limited. For example, FIG. 3A is a schematic diagram of a variation of the bubble mixing channel in FIG. 2B, and FIG. 3B is a schematic diagram of another variation of the bubble mixing channel in FIG. 2B. As shown in FIG. 3A, the bent portion 121a of the bubble mixing channel 12a is a communicated structure, so that the bubble mixing channel 12a forms a structure including an annular channel. As shown in FIG. 3B, the bent portion 121b of the bubble mixing channel 12b is a structure with a greater aperture so that the bubble B and the coagulating solution can form the eddy current at the bent portion 121b to uniformly mix the bubble B with the coagulating solution. However, this invention is not limited to the structure of the bent portion. Moreover, since the shape of the bent portion 121 (121a, 121b) will affect the degree of the mixing between the bubble B and the coagulating solution, the shape of the bent portion 121 (121a, 121b) can be adjusted according to the required degree of the mixing.

As shown in FIGS. 2A and 2B, the foam containing gel solution is formed at the first outlet 113 and flows within the bubble mixing channel 12. When flowing through the intersection of the bubble mixing channel 12 and the coagulating solution channel 13, the bubble B starts to contact the coagulating solution and the gel coagulation effect is thus started. Then, the bubble B is changed in shape when flowing through the bent portion 121 and becomes a more viscous gel solution due to the gel coagulation effect. Then, the bubbles B enter into the bubble collector 14 through the second outlet 122 and will be stacked. The size of the bubble B can be adjusted by at least one of the gel solution supply unit 3 adjusting the flow rate of the gel solution, the airflow supply unit 2 adjusting the flow rate of the gas, and the size of the first outlet 113.

Figure 4A:
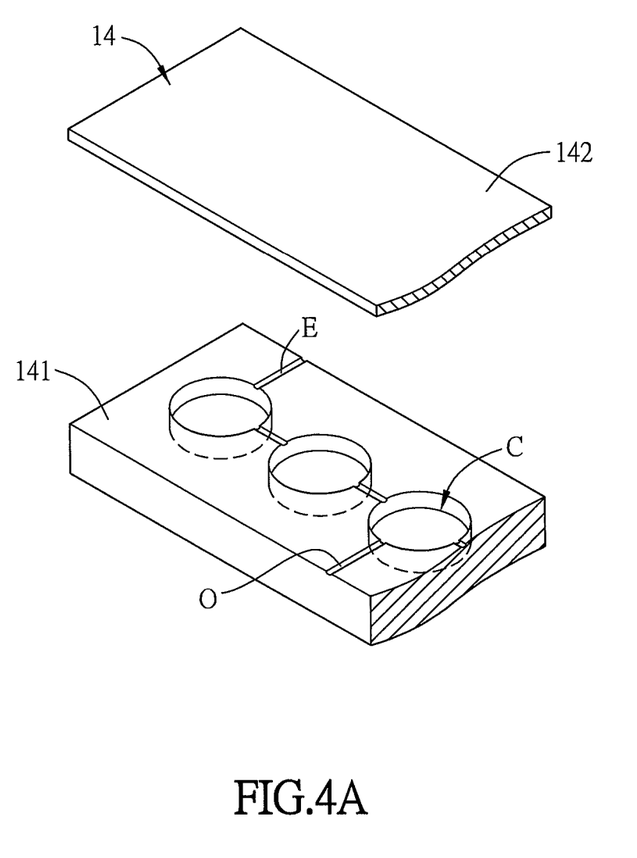
FIG. 4A is a schematic diagram of the bubble collector in FIG. 2A.
Figure 4B:
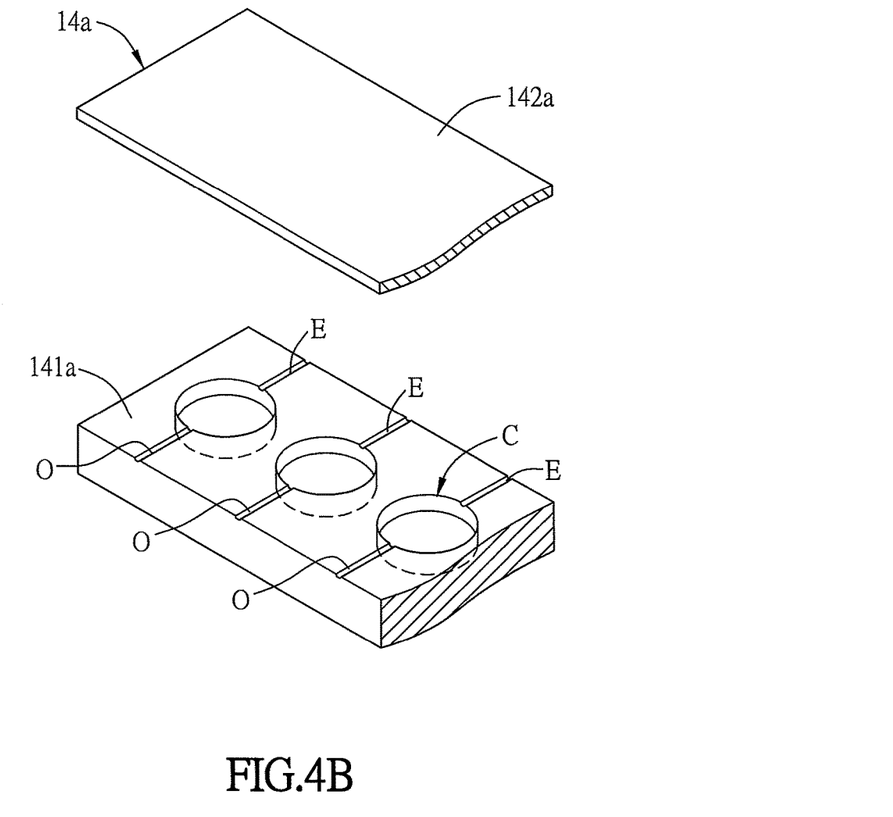
FIG. 4B is a schematic diagram of a variation of the bubble collector in FIG. 2A.

FIG. 4A is a schematic diagram of the bubble collector in FIG. 2A. As shown in FIG. 4A, the bubble collector 14 of this embodiment includes a lower plate 141, and the lower plate 141 has a plurality of recesses C to accommodate the bubbles B. The bubbles B generated by the bubble generator 11 can flow through the bubble mixing channel 12 and flow into the recesses C through the second outlet 122. Hence, the bubbles B can be collected within the recesses C and can be automatically arranged tightly. Besides, the gel coagulation effect on the bubble B can be continued in the recesses C. Therefore, people in the business can obtain the 3-D scaffold matching the size and shape of the recess C by designing the size and shape of the recess C to collect the bubbles. In this embodiment, the size and shape of the recess C is designed as the aperture size of the well plate that is often used in the laboratory to facilitate the proceeding of the subsequent experiment (e.g. protein binding or cell seeding). The recess C of this embodiment is shaped like a disc, and it also can be shaped like an ellipse or a polygon, and the invention is not limited thereto. Moreover, the recess C can communicate with an adjacent recess C or not, and in this embodiment, the communicated recesses C are taken as an example. As shown in FIGS. 2B and 4A, if the recesses C of the lower plate 141 communicate with each other, the bubble collector 14 needs to have an inlet E, which can be connected with the second outlet 122 in FIG. 2B so that the bubbles B can enter into the recesses C through the inlet E after flowing out of the bubble mixing channel 12. The bubbles B can be sent to every recess C through the communicated recesses C, and one of the recesses C has an outlet O to discharge the surplus bubbles to speed up the operation. Of course, in other embodiments, as shown in FIG. 4B, which is a schematic diagram of a variation of the bubble collector in FIG. 2A, the recesses C don't communicate with each other, and that means each of the recesses C has its own inlet E and outlet O. Favorably, the bubble collector 14a further includes an upper plate 142a, and the upper plate 142a and the lower plate 141a are tightly connected with each other to cover the recesses C so that the contamination risk can be reduced.

As shown in FIGS. 2A and 2B, favorably, while the bubbles B undergo the gel coagulation effect in the bubble collector 14, the bubble collector 14 can be set in an environment with the temperature higher than the room temperature, such as 50° C.~70° C. or 60° C. favorably, since the gel coagulation effect on the bubbles can be accelerated under the environment of about 60° C. Then, the gel coagulation effect on the bubbles B can be completed in the bubble collector 14. That the gel coagulation effect is completed means that the more viscous foam containing gel solution (i.e. the bubbles within the bent portion 121 or just entering into the bubble collector 14 with the phase that contacts the coagulating solution but is not coagulated into the gel), which are automatically stacked into a tight arrangement, are coagulated into a 3-D gel structure (the stack of the bubbles B). Then, the step S40 in FIG. 1 is to communicate with at least a part of the bubbles B to form a 3-D scaffold. In this embodiment, the gas within the bubbles B is extracted under a vacuum environment and the bubbles B will be broken due to the pressure difference, so that the closed-cell foam becomes the open-cell foam. In detail, in this manner, the coagulated gel structure (hereinafter called "coagulated structure") formed after the gel coagulation effect on the bubble B is completed can be set in a vacuum environment, and since the air pressure of the external environment is less than the pressure of the gas within the bubble of the coagulated structure, the gas will be automatically discharged from the coagulated structure, and the coagulated structure can form the 3-D scaffold.

As a whole, in the fabricating device and method of the 3-D scaffold of this embodiment, a plurality of bubbles B of the gel solution are formed by the bubble generator 11 and then sent into the bubble mixing channel 12 to mix with the coagulating solution to start the gel coagulation effect. The bubble mixing channel 12 is connected with the bubble collector 14, so that the bubbles B starting to undergo the gel coagulation effect are stacked in the bubble collector 14 to form a 3-D structure. After the gel coagulation effect completely makes the bubbles B become a coagulated structure, the gas within the bubbles B of the coagulated structure is discharged to form the 3-D scaffold.

Figure 5:
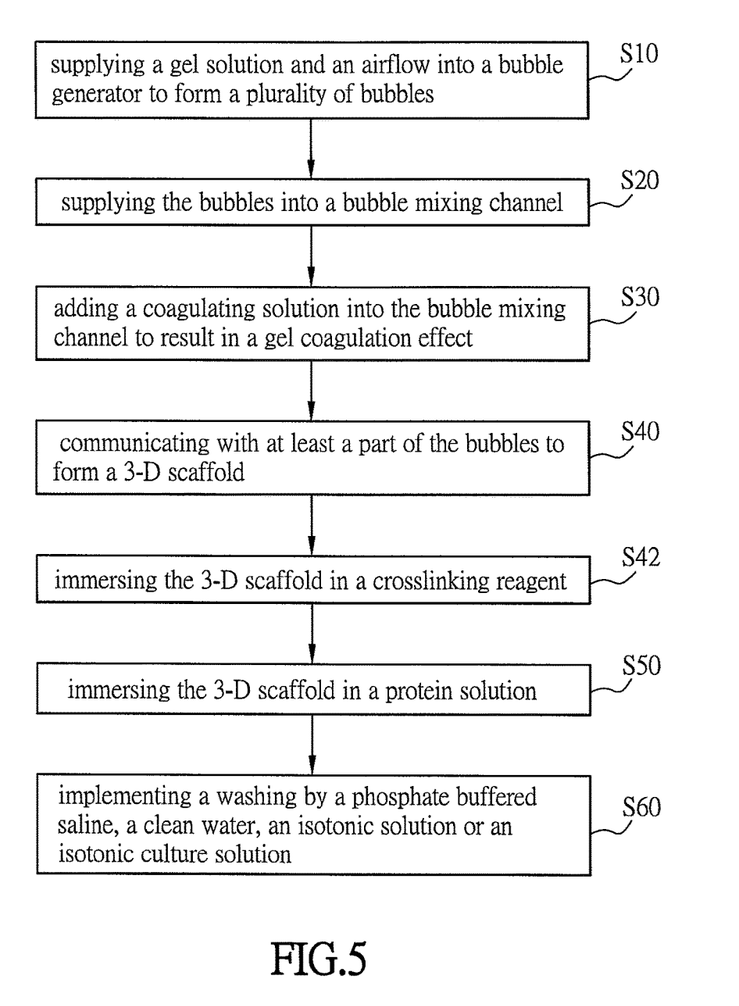
FIG. 5 is a schematic flowchart of a fabricating method of a 3-D scaffold according to another embodiment of the invention.

Besides, FIG. 5 is a schematic flowchart of a fabricating method of a 3-D scaffold according to another embodiment of the invention. The fabricating method of the 3-D scaffold can further include the step of immersing the 3-D scaffold in a protein solution (step S50). Since the steps S10~S40 are the same as the above embodiment, they are not described here for conciseness. In the step S50, the 3-D scaffold formed in the step S40 is immersed in a protein solution. Favorably, the protein solution contains a fibronectin to bind the fibronectin to the 3-D scaffold so that the 3-D scaffold can simulate the extracellular matrix (ECM) for the cell culture to achieve the researchful or medical purpose. Of course, in other embodiments, the protein solution can be another kind of protein, and this invention is not limited to the fibronectin. Favorably, the fabricating method of the 3-D scaffold can further include the step S42 of immersing the 3-D scaffold in a crosslinking reagent. Therefore, the crosslinking reagent will first be connected to the 3-D scaffold, and then the fibronectin will be bound to the 3-D scaffold through the structure of the crosslinking reagent. In detail, since the monomer (first material, Acrylamide for example) is the main ingredient of the gel solution, the crosslinking reagent is favorably the substance with a heterobifunctional group, one end of which can be connected to the monomer while the other end can be connected to the amino group of the protein. The crosslinking reagent of this embodiment is exemplified as the photosensitive crosslinking reagent, which is, for example but not limited to, sulphonated phenyl azide, such as Sulfosuccinimidyl-6-[4-azido-2-nitrophenylamino]hexanoate (Sulfo-SANPAH), one end of which can be connected to the acrylamide of the monomer while the other end can be connected to the amino group of the fibronectin so that the fibronectin can be connected to the 3-D scaffold to form the 3-D scaffold having the fibronectin for the cell culture. Of course, in other embodiments, the protein solution also can have molecules that can generate crosslinking effect, and the invention is not limited thereto.

In practice, the 3-D scaffold formed in the step S40 can be immersed in a crosslinking reagent (step S42). Then, since the photosensitive crosslinking reagent is used in this embodiment, the UV illumination can be applied to the 3-D scaffold immersed in the crosslinking reagent to make the Sulfo-SANPAH of the crosslinking reagent fixed to the Acrylamide as the monomer. Then, the water is used to wash the 3-D scaffold to remove the Sulfo-SANPAH that is not fixed to the 3-D scaffold. Subsequently, the 3-D scaffold processed by the crosslinking reagent is immersed in the solution containing the fibronectin (step S50) so that the fibronectin can be connected with the 3-D scaffold by the crosslinking reagent. Therefore, the 3-D scaffold formed by the fabricating method can be bound with the fibronectin (protein) so as to simulate the extracellular matrix (ECM) for the application of related cell experiments.

Moreover, in this embodiment, the fabricating method of the 3-D scaffold can further include the step S60 of implementing a washing by a phosphate buffered saline, a clean water, an isotonic solution or an isotonic culture solution. In detail, the 3-D scaffold including the fibronectin is washed by a phosphate buffered saline, a clean water, an isotonic solution or an isotonic culture solution. Herein, the 3-D scaffold is washed three times by the phosphate buffered saline, and each time takes an hour to make the environment of the 3-D scaffold suitable for the subsequent cell culture.

Summarily, in the fabricating method and device of a 3-D scaffold of the invention, the bubble generator is just used to make the flowing gel solution and airflow form a plurality of bubbles, and the bubbles flow through the first outlet and within the bubble mixing channel and start to contact the coagulation solution when flowing through the intersection of the coagulating solution channel and the bubble mixing channel, so that the foam containing gel solution and the coagulating solution are mixed together within the bubble mixing channel to result in the gel coagulation effect. After becoming more viscous due to the gel coagulation effect within the bubble mixing channel, the bubbles flow through the second outlet to enter into the bubble collector for the bubble stacking. Besides, the gel coagulation effect can be completed in the bubble collector so that the bubbles can be coagulated to form a 3-D bubble stack structure. Subsequently, at least a part of the bubbles are made communicate with each other to form a 3-D scaffold. Therefore, the invention provides a simple and fast fabricating device and method of the 3-D scaffold.

Besides, the aperture size or shape of the bubble mixing channel can be adjusted to control the size and shape of the formed bubble to further adjust the aperture size and rate of the formed 3-D scaffold. In addition, because the bubbles are stacked into a 3-D structure within the bubble collector by flowing through the bubble mixing channel, the holes of the 3-D scaffold can have approximately the same size.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of fabricating a 3-D scaffold, comprising steps of:
   (A) supplying a gel solution and an airflow into a bubble generator to form a plurality of bubbles;
   (B) supplying the bubbles into a bubble mixing channel through which the bubbles flow to a bubble collector;
   (C) adding a coagulating solution into the bubble mixing channel before the bubbles are collected to result in a gel coagulation effect in the bubble mixing channel;
   (D) collecting the bubbles in the bubble collector before the gel coagulation effect is finished; wherein the gel coagulation effect is a reaction that a foam containing the gel solution is coagulated into a solid-state structure; and
   (E) communicating with at least a part of the bubbles to form a 3-D scaffold,
   wherein the bubble mixing channel is connected to a coagulating solution channel through which the coagulating solution is added, and the bubble mixing channel includes at least a bent portion and a first outlet, the bent portion is disposed between the first outlet and an intersection of the bubble mixing channel and the coagulating solution channel, the bubbles start to contact the coagulating solution at the intersection of the bubble mixing channel and the coagulating solution channel and the gel coagulation effect is thus started; wherein the bubbles are changed in shape because of flowing through the bent portion.

2. The fabricating method as recited in claim 1, wherein the gel solution contains a first material and a second material, and the first and second materials are mixed to form the gel solution.

3. The fabricating method as recited in claim 2, wherein one of the first and second materials contains monomers, and the other contains a crosslinker.

4. The fabricating method as recited in claim 1, wherein the coagulating solution contains an initiator so as to initiate the gel coagulation effect.

5. The fabricating method as recited in claim 4, wherein the gel solution further contains a catalyst so as to accelerate the gel coagulation effect.

6. The fabricating method as recited in claim 1, wherein the gel coagulation effect is performed at a temperature of 50° C.-70° C.

7. The fabricating method as recited in claim 1, wherein in the step of communicating with at least a part of the bubbles, the bubbles are immersed in a liquid under a low pressure environment and the gas within the bubbles is removed by an air extraction.

8. The fabricating method as recited in claim 1, further comprising a step of:
   immersing the 3-D scaffold in a protein solution.

9. The fabricating method as recited in claim 8, wherein the protein solution contains a fibronectin.

10. The fabricating method as recited in claim 8, further comprising a step of:
    immersing the 3-D scaffold in a crosslinking reagent.

11. The fabricating method as recited in claim 1, further comprising a step of:
    implementing a washing with phosphate buffered saline, clean water, an isotonic solution or an isotonic culture solution.

12. The fabricating method as recited in claim 1, wherein the bubble generator includes a gas channel and a gel solution channel, the gel solution channel crosses the gas channel, the gel solution flows through the gel solution channel, and the airflow flows through the gas channel.

13. The fabricating method as recited in claim 1, wherein the bubble mixing channel is connected with an outlet of the bubble generator, and the coagulating solution channel is disposed apart from the outlet of the bubble generator by a distance.

\* \* \* \* \*